US012642297B2

(12) United States Patent
Han et al.

(10) Patent No.: US 12,642,297 B2
(45) Date of Patent: Jun. 2, 2026

(54) SIDESTREAM SMOKE REMOVAL DEVICE AND CONTROL METHOD THEREOF

(71) Applicant: KT&G CORPORATION, Daejeon (KR)

(72) Inventors: Seung Kyu Han, Daejeon (KR); Jae Hyun Kim, Daejeon (KR); Tae Heon Kim, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 424 days.

(21) Appl. No.: 17/802,337

(22) PCT Filed: Sep. 15, 2021

(86) PCT No.: PCT/KR2021/012550
§ 371 (c)(1),
(2) Date: Aug. 25, 2022

(87) PCT Pub. No.: WO2022/092562
PCT Pub. Date: May 5, 2022

(65) Prior Publication Data
US 2023/0000149 A1      Jan. 5, 2023

(30) Foreign Application Priority Data

Oct. 27, 2020     (KR) ........................ 10-2020-0140214

(51) Int. Cl.
*A24F 13/08*          (2006.01)
*A24F 13/18*          (2006.01)
(Continued)

(52) U.S. Cl.
CPC .............. *A24F 13/08* (2013.01); *A24F 13/18* (2013.01); *A24F 40/20* (2020.01); *A24F 40/485* (2020.01);
(Continued)

(58) Field of Classification Search
None
See application file for complete search history.

(56) References Cited

U.S. PATENT DOCUMENTS 5,497,791 A *   3/1996   Bowen .................... A24F 13/00
                                                         131/201
8,109,276 B2    2/2012   Gidding
(Continued)

FOREIGN PATENT DOCUMENTS

CN         108741225 A       11/2018
JP         8-508646 A        9/1996
(Continued)

OTHER PUBLICATIONS

Chapter 3—Thermocouple Temperature Sensors (pp. 63-85), Microcontroller Based Temperature Monitoring and Control (Year: 2002).*
(Continued)

*Primary Examiner* — Philip Y Louie
*Assistant Examiner* — Vu P Pham
(74) *Attorney, Agent, or Firm* — Sughrue Mion, PLLC

(57) ABSTRACT

Provided herein are a sidestream smoke removal device and a control method thereof. The sidestream smoke removal device according to some embodiments includes a housing in which a smoking space is formed, an ignition portion configured to ignite the smoking article inserted into the smoking space, a sidestream smoke processing portion configured to process sidestream smoke generated from the smoking article inserted into the smoking space, a temperature sensor configured to measure the temperature of the smoking article inserted into the smoking space, a display disposed outside the housing, and a controller configured to monitor smoking progress with respect to the smoking article on the basis of the measured temperature and display a monitoring result through the display. The sidestream
(Continued)

smoke removal device can visually provide a series of information related to smoking progress to a user, and accordingly, ease of use and safety may be significantly improved.

7 Claims, 8 Drawing Sheets

(51) Int. Cl.

| | |
|---|---|
| *A24F 40/20* | (2020.01) |
| *A24F 40/485* | (2020.01) |
| *A24F 40/51* | (2020.01) |
| *A24F 40/60* | (2020.01) |
| *G01K 1/02* | (2021.01) |
| *G01K 1/14* | (2021.01) |
| *G01K 3/14* | (2006.01) |

(52) U.S. Cl.
CPC .............. *A24F 40/51* (2020.01); *A24F 40/60* (2020.01); *G01K 1/026* (2013.01); *G01K 1/14* (2013.01); *G01K 3/14* (2013.01)

(56) References Cited

U.S. PATENT DOCUMENTS

| | | | |
|---|---|---|---|
| 2014/0014125 A1* | 1/2014 | Fernando | ................ A24F 40/50 131/328 |
| 2015/0040925 A1* | 2/2015 | Saleem | ................... A24F 40/50 131/328 |

| | | | |
|---|---|---|---|
| 2017/0106153 A1* | 4/2017 | Davidson | .......... A61M 15/0003 |
| 2017/0325501 A1 | 11/2017 | Wanner | |
| 2018/0352860 A1* | 12/2018 | Qiu | ......................... A24F 40/50 |
| 2020/0154760 A1 | 5/2020 | Prog et al. | |
| 2020/0281278 A1* | 9/2020 | Davis | ...................... A24F 40/60 |
| 2021/0235763 A1 | 8/2021 | Park et al. | |
| 2022/0211113 A1* | 7/2022 | Ruscio | .................... A24F 40/40 |
| 2022/0346458 A1* | 11/2022 | Zominy | .................. A24F 40/53 |

FOREIGN PATENT DOCUMENTS

| | | | | | |
|---|---|---|---|---|---|
| JP | 2013-526855 | A | 6/2013 | | |
| JP | 2015-513922 | A | 5/2015 | | |
| KR | 10-1746811 | B1 | 6/2017 | | |
| KR | 10-2017-0130689 | A | 11/2017 | | |
| KR | 20180070443 | A | * 6/2018 | .............. | G08B 5/22 |
| KR | 10-2018-0085339 | A | 7/2018 | | |
| KR | 10-2020-0071393 | A | 6/2020 | | |
| WO | 2007/078197 | A2 | 7/2007 | | |
| WO | 2020/085365 | A1 | 4/2020 | | |

OTHER PUBLICATIONS

English translation of KR20180070443A (Year: 2018).*

Japanese Office Action dated Sep. 19, 2023 in Application No. 2022-542793.

Office Action dated Oct. 28, 2022 from the Korean Intellectual Property Office in KR Application No. 10-2020-0140214.

Extended European Search Report dated Nov. 8, 2022 from the European Patent Office in EP Application No. 21886556.6.

International Search Report for PCT/KR2021/012550 dated Dec. 27, 2021 (PCT/ISA/210).

* cited by examiner

SIDESTREAM SMOKE REMOVAL DEVICE AND CONTROL METHOD THEREOF

CROSS REFERENCE TO RELATED APPLICATIONS

This application is a National Stage of International Application No. Entry of PCT/KR2021/012550 filed Sep. 15, 2021, claiming priority based on Korean Patent Application No. 10-2020-0140214 filed Oct. 27, 2020.

TECHNICAL FIELD

The present disclosure relates to a sidestream smoke removal device and a control method thereof, and more particularly, to a sidestream smoke removal device and a control method thereof capable of, by automatically displaying information on smoking progress, promoting ease of use and safety.

BACKGROUND ART

A sidestream smoke removal device is a kind of smoking aid that typically has a closed smoking space and a sidestream smoke remover. Users may insert a cigarette into the smoking space inside the sidestream smoke removal device and smoke the cigarette.

While providing advantageous effects such as reducing hand smell and removing (purifying) sidestream smoke, the sidestream smoke removal device has a problem in that, since smoking occurs in the smoking space therein, it is difficult for users to check smoking progress. For example, it is difficult for users to check whether ignition has occurred properly, whether an end of smoking is almost reached, etc.

Also, sometimes, in order to directly check smoking progress, users may, during smoking, perform manipulations such as opening the smoking space or removing the cigarette from the smoking space and then inserting the cigarette back into the smoking space. When such manipulations are performed during combustion of the cigarette, the risk of burns and fire may sharply increase.

DISCLOSURE

Technical Problem

Some embodiments of the present disclosure are directed to providing a sidestream smoke removal device and a control method thereof capable of, by automatically displaying information on smoking progress, promoting ease of use and safety.

Objectives of the present disclosure are not limited to the above-mentioned objective, and other unmentioned objectives should be clearly understood by those of ordinary skill in the art to which the present disclosure pertains from the description below.

Technical Solution

A sidestream smoke removal device according to some embodiments of the present disclosure includes a housing in which a smoking space is formed, an article insertion portion which is disposed at one end of the housing and forms an opening for insertion of a smoking article into the smoking space, an ignition portion which is configured to ignite the smoking article inserted into the smoking space, a sidestream smoke processing portion which is configured to process sidestream smoke generated from the smoking article inserted into the smoking space, a temperature sensor which is configured to measure the temperature of the smoking article inserted into the smoking space, a display which is disposed on the outside of the housing, and a controller which is configured to monitor smoking progress with respect to the smoking article on the basis of the measured temperature and display a monitoring result through the display.

In some embodiments, the temperature sensor may be disposed to measure the temperature near a downstream end of a smoking material portion constituting the inserted smoking article, and on the basis of the temperature measured by the temperature sensor, the controller may determine whether smoking has ended.

In some embodiments, the temperature sensor may include a first temperature sensor and a second temperature sensor which are disposed at different positions inside the smoking space, and on the basis of temperatures measured by the first temperature sensor and the second temperature sensor, the controller may monitor smoking progress.

In some embodiments, the first temperature sensor and the second temperature sensor may be disposed in the longitudinal direction of the smoking article, and the controller may compare temperatures measured by the first temperature sensor and the second temperature sensor to monitor smoking progress and may display, through the display, information on the smoking progress.

In some embodiments, the temperature sensor may have an elongated body, may be disposed in the longitudinal direction of the inserted smoking article, and may be configured so that a first portion of the elongated body measures the temperature of a first corresponding portion of the smoking material portion constituting the smoking article and a second portion of the elongated body measures the temperature of a second corresponding portion of the smoking material portion, and the controller may monitor smoking progress on the basis of the temperatures measured by the first portion and the second portion.

In some embodiments, the controller may, through the display, display information related to the smoking progress and may control the display to change the length of an indicator or the size of a display area of the indicator, as smoking is performed.

In some embodiments, a vent through which outside air enters may be formed in the housing.

In some embodiments, a vent through which outside air enters may be formed in the housing, the sidestream smoke processing portion may include an exhaust fan configured to exhaust the sidestream smoke through rotation, and the controller may detect an end of smoking on the basis of the measured temperature and may, in response to detecting the end of smoking, close the vent and stop operation of the exhaust fan.

Advantageous Effects

According to some embodiments of the present disclosure, a sidestream smoke removal device including a display can be provided, and information on smoking progress can be automatically provided through the display. Accordingly, since a user is able to directly check smoking progress without manipulating the device, ease of use and safety can be significantly improved.

Also, by using a plurality of temperature sensors disposed at different positions inside a smoking space or using an elongated temperature sensor disposed in a longitudinal direction, smoking progress can be easily monitored without an additional monitoring module. For example, puff events can be easily monitored by measuring changes in temperature, and the current smoking position of a smoking article can be easily monitored by comparing temperatures measured by the plurality of temperature sensors.

In addition, a vent and an exhaust fan can be appropriately controlled according to smoking progress, and thus a user's smoking satisfaction can be improved.

In addition, an automatic extinguishing function can be performed upon detecting an end of smoking. Accordingly, the risk of fire and burns due to the user's carelessness can be minimized.

The advantageous effects according to the technical spirit of the present disclosure are not limited to the above-mentioned advantageous effects, and other unmentioned advantageous effects should be clearly understood by those of ordinary skill in the art from the description below.

MODES OF THE INVENTION

Figure 1:
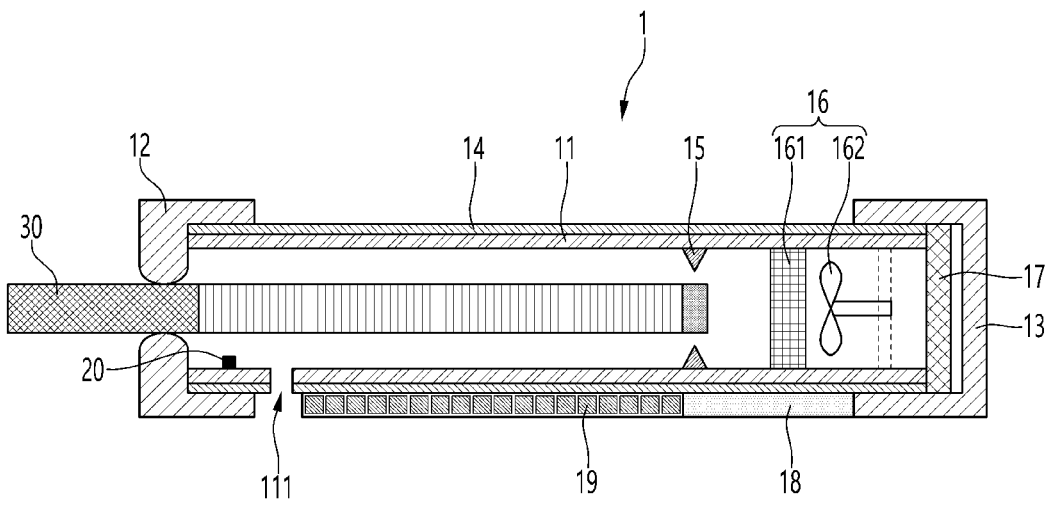
FIG. 1 is an exemplary view for describing a structure of a sidestream smoke removal device according to some embodiments of the present disclosure.

Hereinafter, preferred embodiments of the present disclosure will be described in detail with reference to the accompanying drawings. Advantages and features of the present disclosure and methods of achieving the same should become clear with embodiments described in detail below with reference to the accompanying drawings. However, the technical spirit of the present disclosure is not limited to the following embodiments and may be implemented in various different forms. The embodiments make the technical spirit of the present disclosure complete and are provided to completely inform those of ordinary skill in the art to which the present disclosure pertains of the scope of the present disclosure. The technical spirit of the present disclosure is defined only by the scope of the claims.

In assigning reference numerals to components of each drawing, it should be noted that the same reference numerals are assigned to the same components as much as possible even when the components are illustrated in different drawings. Also, in describing the present disclosure, when detailed description of a known related configuration or function is deemed as having the possibility of obscuring the gist of the present disclosure, the detailed description thereof will be omitted.

Unless otherwise defined, all terms including technical or scientific terms used herein have the same meaning as commonly understood by those of ordinary skill in the art to which the present disclosure pertains. Terms defined in commonly used dictionaries should not be construed in an idealized or overly formal sense unless expressly so defined herein. Terms used herein are for describing the embodiments and are not intended to limit the present disclosure. In this specification, a singular expression includes a plural expression unless the context clearly indicates otherwise.

Also, in describing components of the present disclosure, terms such as first, second, A, B, (a), and (b) may be used. Such terms are only used for distinguishing one component from another component, and the essence, order, sequence, or the like of the corresponding component is not limited by the terms. In a case in which a certain component is described as being "connected," "coupled," or "linked" to another component, it should be understood that, although the component may be directly connected or linked to the other component, still another component may also be "connected," "coupled," or "linked" between the two components.

The terms "comprises" and/or "comprising" used herein do not preclude the presence or addition of one or more components, steps, operations, and/or devices other than those mentioned.

First, some terms used in various embodiments of the present disclosure will be clarified.

In the following embodiments, "smoking article" may refer to any product that can be smoked or any product that can provide a smoking experience, regardless of whether the product is based on tobacco, tobacco derivatives, expanded tobacco, reconstituted tobacco, or tobacco substitutes. For example, smoking articles may include products that can be smoked, such as a cigarette, a cigar, and a cigarillo.

In the following embodiments, "smoking material" may refer to a material that generates smoke and/or an aerosol or is used in smoking. For example, the smoking material may include a tobacco material. For example, the tobacco material may include pieces of tobacco leaves, tobacco stems, and materials obtained by processing the same. As a more specific example, the tobacco material may include ground tobacco leaves, ground reconstituted tobacco, expanded shredded tobacco, expanded tobacco midribs, reconstituted tobacco leaves, and the like, but is not limited thereto.

In the following embodiments, "upstream" or "upstream direction" may refer to a direction moving away from an oral region of a user, and "downstream" or "downstream direction" may refer to a direction approaching the oral region of the user. The terms "upstream" and "downstream" may be used to describe relative positions of components constituting a smoking article. For example, in a smoking article 30 illustrated in FIG. 1 and so on, a filter portion is disposed downstream or in a downstream direction of a smoking material portion, and the smoking material portion is disposed upstream or in an upstream direction of the filter portion.

In the following embodiments, "longitudinal direction" may refer to a direction corresponding to a longitudinal axis of a smoking article.

In the following embodiments, "puff" refers to inhalation by a user, and the inhalation may refer to a situation in which a user draws smoke into his or her oral cavity, nasal cavity, or lungs through the mouth or nose.

Hereinafter, various embodiments of the present disclosure will be described in detail with reference to the accompanying drawings.

FIG. 1 is an exemplary view for describing a structure of a sidestream smoke removal device 1 according to some embodiments of the present disclosure. In particular, the drawings such as FIG. 1 illustrate a state in which the smoking article 30 is inserted into the sidestream smoke removal device 1.

As illustrated in FIG. 1, the sidestream smoke removal device 1 may include a housing 11, an article insertion portion 12, a back cover 13, an insulating portion 14, a temperature sensor 20, an ignition portion 15, a sidestream smoke processing portion 16, a mesh 17, a display 19, and a controller 18. However, only the components relating to the embodiment of the present disclosure are illustrated in FIG. 1. Therefore, those of ordinary skill in the art to which the present disclosure pertains should understand that the sidestream smoke removal device 1 may further include general-purpose components other than the components illustrated in FIG. 1. For example, the sidestream smoke removal device 1 may further include a battery (not illustrated) configured to supply power to electrical components (e.g., the controller 18, the display 19, etc.). Also, some of the components illustrated in FIG. 1 may not be essential components of the sidestream smoke removal device 1. That is, the sidestream smoke removal device 1 may also be implemented in a form in which some of the components illustrated in FIG. 1 are omitted. Hereinafter, each component of the sidestream smoke removal device 1 will be described.

The housing 11 may form a smoking space inside the sidestream smoke removal device 1 and may form at least a portion of an exterior of the sidestream smoke removal device 1. FIG. 1 illustrates the housing 11 as a sidewall of the sidestream smoke removal device 1, but the housing 11 may also refer to the entire exterior-forming structure including the article insertion portion 12, the back cover 13, and the insulating portion 14. In order to ensure the durability of the sidestream smoke removal device 1 and minimize the risk of damage thereto, the housing 11 may be made of a sturdy material.

In some embodiments, a vent 111 may be formed in the housing 11 to allow outside air to smoothly enter the smoking space. By allowing the outside air to enter during smoking, the vent 111 may promote combustion of the smoking article 30, and accordingly, a smoking function of the sidestream smoke removal device 1 may be significantly improved. FIG. 1 illustrates an example in which a single vent 111 is formed in the housing 11, but the number of vents 111 may also be plural. In addition, positions at which vents 111 are formed, sizes of the vents, intervals between the vents, etc. may also be designed in various ways. The opening/closing of the vent 111 and/or a degree of opening/closing thereof may be controlled by the controller 18. This will be described below with reference to FIG. 7.

Next, the article insertion portion 12 may be disposed at one end (e.g., an upper end) of the housing 11 and form an opening for insertion of the smoking article 30. A user may insert the smoking article 30 into the smoking space inside the sidestream smoke removal device 1 through the article insertion portion 12. In order to block the heat inside the smoking space from being released to the outside, the article insertion portion 12 may be made of an insulating material. Also, in order to prevent shaking of the inserted smoking article 30, the article insertion portion 12 may have a holder structure that can hold the smoking article 30.

In some embodiments, the article insertion portion 12 may have a structure in which it is possible to adjust the size of the opening. For example, the article insertion portion 12 may have a structure that allows the opening to be tightened or loosely expanded through manual operation. As another example, the article insertion portion 12 may also be configured to automatically tighten the opening to fit the smoking article 30. As a more specific example, the article insertion portion 12 may be controlled by the controller 18, and the controller 18 may control the opening of the article insertion portion 12 to be tightened upon a sensor detecting insertion of the smoking article 30 or upon reception of a user input (e.g., a push on a button). According to the present embodiment, since the size of the opening is adjusted to fit the smoking article 30, shaking of the smoking article 30 may be prevented, and support stability for the smoking article 30 may be improved. Further, since it becomes possible to insert smoking articles of various sizes, usability of the sidestream smoke removal device 1 may also be improved.

The smoking article 30 may consist of a filter portion which is disposed at a downstream portion and a smoking material portion which abuts an upstream end of the filter portion. However, a detailed structure of the smoking article 30 may be modified in various ways. The filter portion may include a filter material that can filter smoke, and the smoking material portion may include a smoking material. Examples of the smoking article 30 may include a combustion-type cigarette, but the smoking article 30 is not limited thereto and may be any article which generates sidestream smoke during smoking.

Next, the back cover 13 may be disposed at the other end (e.g., a lower end) of the housing 11 and serve as a cover of the sidestream smoke removal device 1. A gas discharge path may be formed in the back cover 13 to allow sidestream smoke processed (purified) through the sidestream smoke processing portion 16 to be discharged to the outside. For example, a gas discharge path such a fine hole may be formed in the back cover 13.

Next, the insulating portion 14 may be made of a material having low thermal conductivity and block the heat inside the smoking space from being released to the outside. By being disposed on an outer surface of the housing 11, the insulating portion 14 may serve to prevent the risk of burns due to internal heat when the user's body comes in contact with the sidestream smoke removal device 1 (e.g., when the user grips the device 1 for smoking).

Next, the temperature sensor 20 may be disposed inside the smoking space and measure the temperature of the smoking article 30 inserted into the smoking space. The number of temperature sensors 20, the shape of temperature sensors 20, positions at which temperature sensors 20 are disposed, intervals at which temperature sensors 20 are disposed, etc. may be designed in various ways and may vary according to the embodiment.

In some embodiments, as illustrated in FIG. 1, the temperature sensor 20 may be disposed to measure the temperature near a downstream end of the smoking material portion. In this case, whether smoking has ended may be accurately determined using only the temperature sensor 20 without an additional monitoring module. This may be understood as using the fact that smoking usually ends upon complete combustion of the smoking material portion. For example, the controller 18 may determine that smoking has ended when the temperature measured by the temperature sensor 20 is a reference value or more (e.g., when the current smoking position reaches the downstream end of the smoking material portion) or when the temperature measured by the temperature sensor 20 increases and then decreases to less than the reference value (e.g., when combustion power weakens at the downstream end of the smoking material portion).

Figure 2:
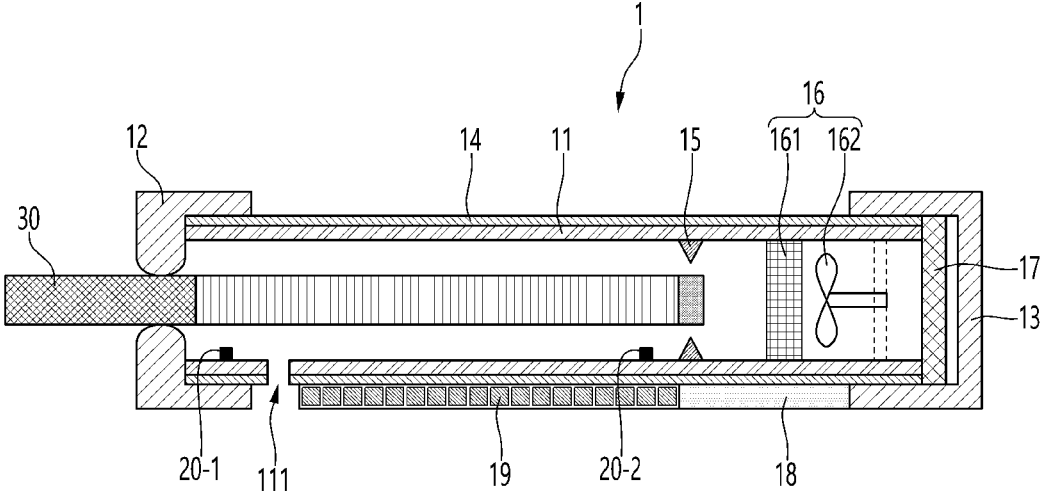
FIGS. 2 to 6 are exemplary views for describing various modifications of the sidestream smoke removal device according to some embodiments of the present disclosure.

In some other embodiments, a plurality of temperature sensors 20 may be disposed at different positions inside the smoking space. For example, as illustrated in FIG. 2, a plurality of temperature sensors 20-1 and 20-2 may be disposed in the longitudinal direction of the smoking article 30. Alternatively, the plurality of temperature sensors 20 may be disposed at positions facing each other. FIG. 2 illustrates an example in which the two temperature sensors 20-1 and 20-2 are disposed, but the number of temperature sensors 20 may also be three or more. Here, the intervals at which the temperature sensors 20 are disposed may be the same or different. When the plurality of temperature sensors 20 are used, smoking progress (e.g., the extent to which the smoking article 30 is smoked) may be more accurately monitored, and various pieces of monitoring information may be obtained as follows.

In some examples, the start of smoking may be detected (determined) through the temperature sensor (e.g., 20-2) disposed near the upstream end of the smoking material portion. For example, the controller 18 may determine that smoking has started when the temperature measured by the temperature sensor (e.g., 20-2) is equal to or higher than a reference value.

In some examples, temperatures measured by the plurality of temperature sensors (e.g., 20-1 and 20-2) disposed in the longitudinal direction may be compared to determine the extent to which the smoking article 30 is smoked (e.g., the current smoking (combustion) position). This example will be described in more detail below with reference to FIGS. 8 and 9.

In some examples, the plurality of temperature sensors 20 may be disposed at positions facing each other with respect to the inserted smoking article 30 or may be disposed in the circumferential direction of the smoking article 30 inside the smoking space (for example, four temperature sensors 20 may be disposed at 90° intervals). In this case, temperatures measured by the plurality of temperature sensors 20 may be compared to determine the extent to which the smoking article 30 is tilted (shaken). For example, when a temperature measured by a specific temperature sensor is higher than a temperature measured by another temperature sensor, the controller 18 may determine that the inserted smoking article 30 is tilted in a direction toward the specific temperature sensor. Alternatively, when temperatures measured by the plurality of temperature sensors 20 fluctuate by a reference value or more, the controller 18 may determine that the inserted smoking article 30 is shaking.

Figure 3:
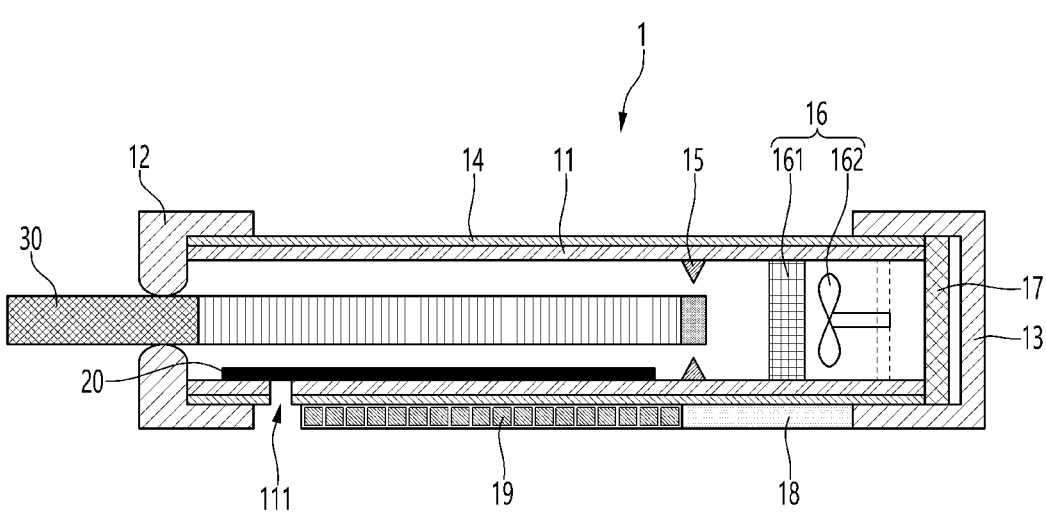

In still some other embodiments, a temperature sensor 20 having an elongated body may be disposed in the smoking space. For example, as illustrated in FIG. 3, the elongated temperature sensor 20 may be disposed in the longitudinal direction of the smoking article 30. The temperature sensor 20 according to the present embodiment may be implemented so that a first portion of the elongated body measures the temperature of a first corresponding portion of the smoking material portion constituting the smoking article 30, and a second portion measures the temperature of a second corresponding portion of the smoking material portion. A specific implementation method may vary. In this case, smoking progress may be monitored on the basis of a temperature measured by a specific portion of the elongated body. For example, the controller 18 may compare temperatures measured by different portions of the elongated body and determine the extent to which the smoking article 30 is smoked.

In yet some other embodiments, the temperature sensor 20 may be disposed on the basis of combinations of the above-described embodiments.

Description will be given by referring back to FIG. 1.

The ignition portion 15 may be disposed inside the smoking space and ignite the smoking article 30 inserted into the smoking space. The ignition portion 15 may be controlled by the controller 18 or may provide an ignition function due to manual operation by a user. The number of ignition portions 15, the shape of ignition portions 15, the arrangement form thereof, etc. may be designed in various ways and may vary according to the embodiment.

In some embodiments, the ignition portion 15 may be disposed at a fixed position. Specifically, as illustrated in FIG. 1 and so on, the ignition portion 15 may be disposed to ignite the vicinity of the upstream end of the inserted smoking article 30. In this case, the structure of the sidestream smoke removal device 1 may be simplified, and thus a defect rate during manufacture may be minimized.

In some other embodiments, the ignition portion 15 may be designed and implemented to be movable. A specific implementation method may vary. For example, the ignition portion 15 may be implemented to move in the longitudinal direction due to manual operation by a user or control by the controller 18. In some examples, the controller 18 may, in response to detecting the insertion of the smoking article 30, move the ignition portion 15 to the upstream end of the smoking article 30. According to the present embodiment, since it becomes possible to universally apply the sidestream smoke removal device 1 to smoking articles of various lengths, the usability of the sidestream smoke removal device 1 may be significantly improved.

Figure 4:
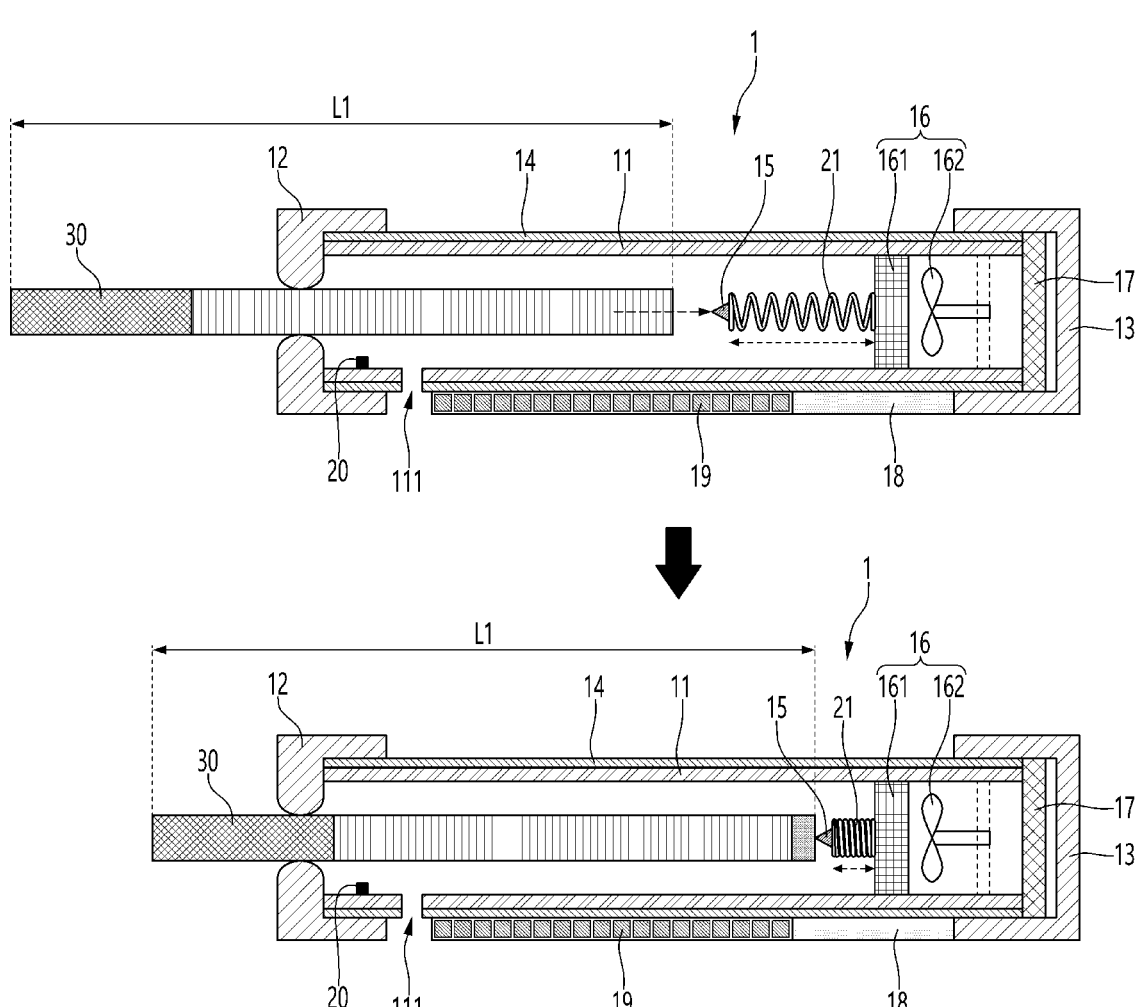

In still some other embodiments, as illustrated in FIG. 4, the ignition portion 15 may be coupled to an elastic support portion 21. The elastic support portion 21 may consist of an elastic body that is able to stretch and contract and may perform a function of elastically supporting the upstream end of the inserted smoking article 30. For example, as the smoking article 30 is inserted, the ignition portion 15 may come in close contact with the upstream end of the smoking article 30, and the elastic support portion 21 may be contracted due to an insertion force and thus stably support the smoking article 30. In some examples, at least a portion of the ignition portion 15 may have a shape that sharply protrudes toward the article insertion portion 12 (e.g., the shape of a needle). In this case, since the ignition portion 15 passes through the upstream end of the smoking article 30 as the smoking article 30 is inserted, the smoking article 30 may be supported more strongly at the time of ignition, and accordingly, support stability and ignition stability may be significantly improved. That is, it is possible to significantly alleviate a problem in which, at the time of ignition, the smoking article 30 is not ignited well due to shaking. According to the present embodiment, since the elastic support portion 21 which is stretchable and contractible allows smoking articles (e.g., 30) of various lengths (e.g., L1) to be stably accommodated, the usability of the sidestream smoke removal device 1 may be significantly improved.

Description will be given by referring back to FIG. 1.

The sidestream smoke processing portion 16 may be disposed inside the smoking space and perform various processes for sidestream smoke generated from the inserted smoking article 30. For example, the sidestream smoke processing portion 16 may be disposed between the inserted smoking article 30 and the back cover 13 and perform a purification function for the sidestream smoke. Also, the sidestream smoke processing portion 16 may further perform an exhaust function that allows the purified sidestream smoke to be easily discharged to the outside. However, a detailed structure and an operation method of the sidestream smoke processing portion 16 may be designed in various ways and may vary according to the embodiment.

In some embodiments, as illustrated, the sidestream smoke processing portion 16 may be configured to include a filter structure 161 and an exhaust fan 162. The filter structure 161 may perform a purification function for the sidestream smoke, and the exhaust fan 162 may perform an exhaust function for the sidestream smoke. For example, the exhaust fan 162 may suction the sidestream smoke toward the filter structure 161 through rotation and allow the sidestream smoke that has passed through the filter structure 161 to be smoothly discharged to the outside. The operation of the exhaust fan 162 may be controlled by the controller 18. This will be described below with reference to FIG. 7 and so on.

Next, the mesh 17 may be disposed between the sidestream smoke processing portion 16 and the back cover 13 and serve as a safety net. For example, the mesh 17 may prevent a specific object (e.g., some pieces of the filter portion 161, etc.) inside the smoking space from being detached toward the back cover 13.

Next, the display 19 may be disposed on an outer surface of the housing 11 to display various pieces of information according to control by the controller 18. For example, the display 19 may display smoking progress information, device information, smoking history information, user information, and the like. Here, examples of the smoking progress information may include information on smoking progress (e.g., any information related to smoking progress such as the extent to which the smoking article 30 is smoked, the current smoking position, the number of remaining puffs, smoking time, remaining smoking time, etc.) and puff information (e.g., any information related to puff events such as a puff number, a puff length, a puff interval, a puff intensity, whether puffs are performed, etc.), but the smoking progress information is not limited thereto. Examples of the device information may include information such as a power state, whether a failure has occurred, and a battery state (e.g., a battery level, whether charging is needed, etc.), but the device information is not limited thereto. The smoking history information may include the cumulative number of cigarettes smoked but is not limited thereto.

The display 19 may include a visual display means such as a light emitting diode (LED) display and thus visually display the various pieces of information. However, a specific display means may vary.

Next, the controller 18 may control the overall operation of the sidestream smoke removal device 1. For example, the controller 18 may control the operation of the exhaust fan 162, control the operation of the display 19, and also control the operation of other components included in the sidestream smoke removal device 1. In addition, the controller 18 may determine smoking progress of the smoking article 30 and may check a state of each of the components of the sidestream smoke removal device 1 to determine whether the sidestream smoke removal device 1 is in an operable state. A specific operation method of the controller 18 will be described in detail below with reference to FIGS. 7 to 10.

The controller 18 may be implemented with at least one processor. The processor may also be implemented with an array of a plurality of logic gates or implemented with a combination of a general-purpose microprocessor and a memory which stores a program that may be executed by the microprocessor. Also, those of ordinary skill in the art to which the present disclosure pertains should clearly understand that the controller 18 may also be implemented with other forms of hardware.

FIG. 1 illustrates the controller 18 as being disposed outside the housing 11 of the sidestream smoke removal device 1, but this is only for convenience of understanding, and the position at which the controller 18 is disposed may vary. For example, in order to prevent a failure due to external impact, the controller 18 may be disposed at a specific position inside the housing 11.

Meanwhile, in some embodiments of the present disclosure, the sidestream smoke removal device 1 may further include a module configured to provide aural and/or tactual outputs. For example, the sidestream smoke removal device 1 may further include a speaker, a vibration module, etc. In this case, the controller 18 may further use these modules to provide various pieces of information to the user.

Figure 5:
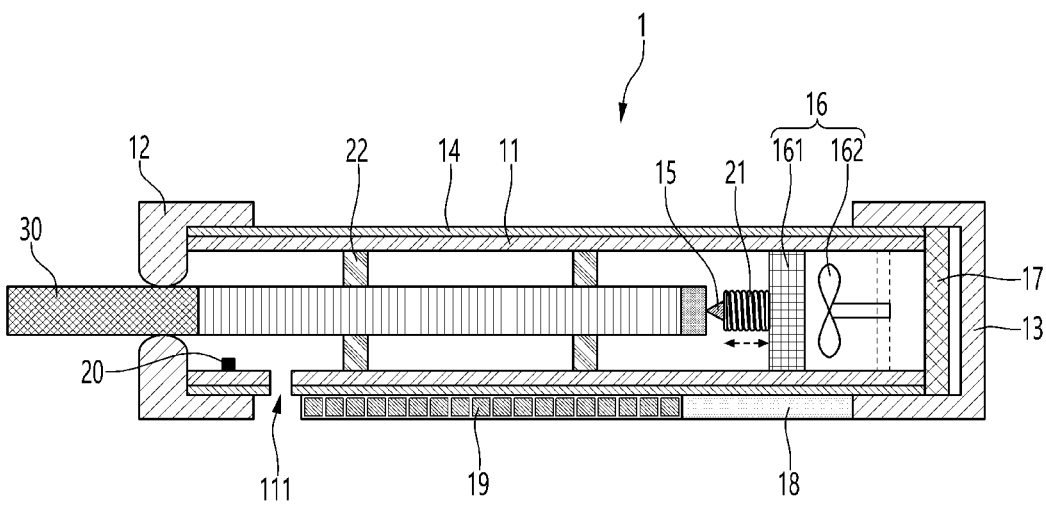

Also, in some embodiments of the present disclosure, as illustrated in FIG. 5, a support portion 22 configured to support a side surface of the smoking article 30 inserted into the smoking space of the sidestream smoke removal device 1 may be further disposed. For example, as illustrated, a plurality of support portions 22 may be disposed to support a side surface at a first point and a side surface at a second point of the smoking article 30. In order to support a specific point of the smoking article 30, a plurality of support portions 22 may be disposed in the circumferential direction of the smoking article 30 (for example, four support portions 22 may be disposed at 90° intervals), or a single support portion 22 formed in a ring shape may be disposed. In this way, the number of support portions 22, the arrangement form thereof, the shape thereof, etc. may be designed and implemented in various ways.

Figure 6:
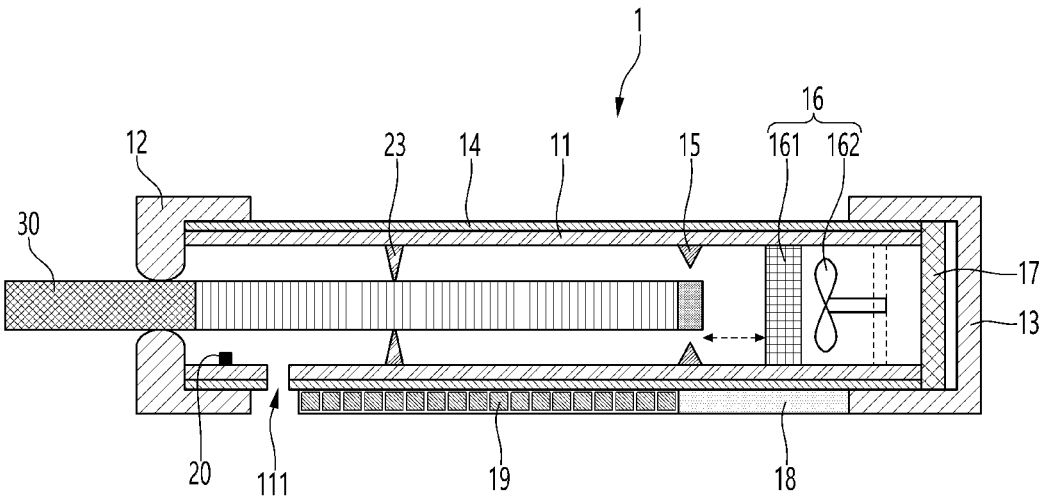

Also, in some embodiments of the present disclosure, as illustrated in FIG. 6, a cutting portion 23 may be further disposed in the smoking space. By cutting the smoking article 30, which is undergoing combustion, to prevent further combustion, the cutting portion 23 may provide a safe extinguishing function at a point in time desired by the user and may minimize the risk of burns that may occur due to carelessness of the user (e.g., the risk of burns due to carelessness when directly extinguishing the smoking article 30) and the risk of fire. However, an implementation method of the cutting portion 23 may be designed in various other ways.

In some examples, the cutting portion 23 may be disposed at a fixed position and configured to cut a specific portion of the inserted smoking article 30. For example, the cutting portion 23 may be disposed to be fixed at a position at which the cutting portion 23 is able to cut between the filter portion and the smoking material portion. In this case, a safe extinguishing function may be ensured regardless of the current smoking (combustion) position of the smoking article 30, and the structure of the sidestream smoke removal device 1 may be simplified.

In some other examples, the cutting portion 23 may be configured to be movable. For example, the cutting portion 23 may be configured to be moved due to an external force (manual operation) by the user or configured to be moved due to control by the controller 18. As a more specific example, by the controller 18, the cutting portion 23 may be automatically moved to the vicinity of the current smoking (combustion) position of the smoking article 30. Refer to the description of FIG. 9 for a method in which the controller 18 determines the current smoking (combustion) position of the smoking article 30.

Also, in some examples, the cutting portion 23 may be operated by the user's actions, such as pressing a push-type button (not illustrated) provided on an outer surface of the housing 11, twisting the housing 11, or stretching or contracting the housing 11 in the longitudinal direction. The cutting portion 23 may have a structure that mechanically interlocks with the housing 11 to operate due to the above-listed actions, or the above-listed actions may cause the controller 18 to operate the cutting portion 23.

The sidestream smoke removal device 1 according to some embodiments of the present disclosure has been described above with reference to FIGS. 1 to 6. According to the above description, by using the plurality of temperature sensors 20 disposed at different positions inside the smoking space or using the elongated temperature sensor 20 disposed in the longitudinal direction, smoking progress may be easily monitored without an additional monitoring module. Also, since information on smoking progress is displayed through the display 19, ease of use and safety may be significantly improved.

Hereinafter, a control method according to some embodiments of the present disclosure will be described with reference to FIG. 7 and so on.

Each step of the control method which will be described below may be performed by the controller (e.g., 18) of the sidestream smoke removal device (e.g., 1). Also, each step of the control method may be implemented with one or more instructions executed by the controller. The control method is applicable to various types of sidestream smoke removal devices, but for convenience of understanding, description will be continued assuming that the control method is performed by the sidestream smoke removal device 1 illustrated in FIGS. 1 to 6. Therefore, in the following description, when the subject of a specific operation is omitted, the specific operation may be understood as being performed by the controller 18 of the illustrated device 1.

Figure 7:
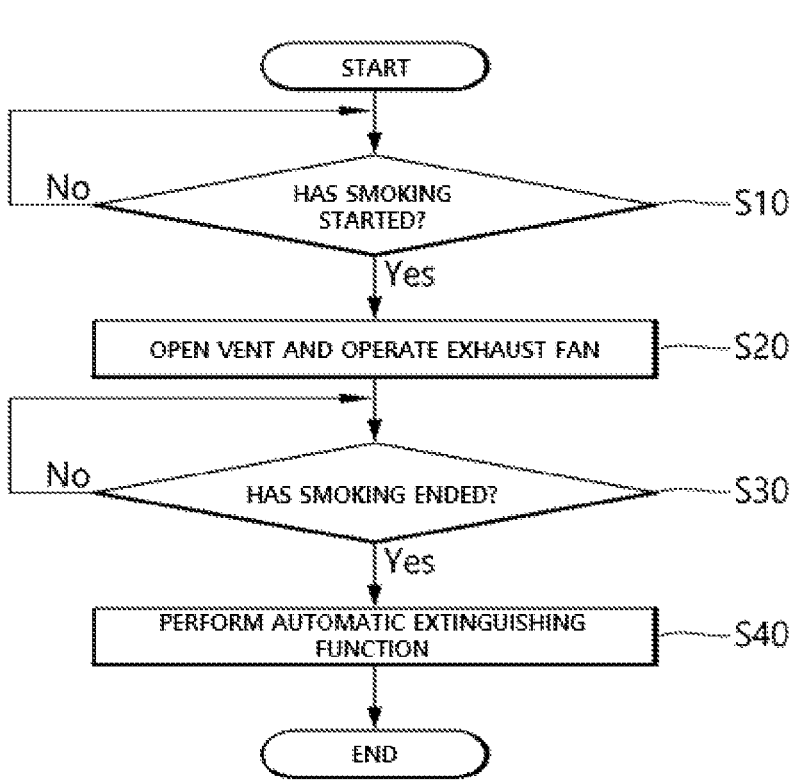
FIG. 7 is an exemplary flowchart showing a control method of the sidestream smoke removal device according to some embodiments of the present disclosure.

FIG. 7 is an exemplary flowchart showing a control method according to some embodiments of the present disclosure. However, this is only a preferred embodiment for achieving the objectives of the present disclosure, and, of course, some steps may be added or omitted as necessary.

As illustrated in FIG. 7, the control method may begin by detecting the start of smoking (S10). In this step, a method of detecting the start of smoking may vary.

In some embodiments, the controller 18 may detect the start of smoking through a user input (e.g., an input on a button, etc.) operating the ignition portion 15. Alternatively, the controller 18 may recognize the start of smoking through a user input (e.g., an input on a button, etc.) requesting to start smoking and may operate the ignition portion 15.

In some other embodiments, the controller 18 may detect the start of smoking in response to determining that a temperature measured by the temperature sensor 20 is a reference value or more. Here, for example, the temperature sensor 20 may be disposed to measure the temperature near the upstream end of the smoking article 30 inside the smoking space.

In step S20, in response to detecting the start of smoking, the controller 18 may open (e.g., partially open or completely open) the vent 111. This is because outside air that enters through the vent 111 may promote combustion of the smoking article 30. Also, the controller 18 may operate the exhaust fan 162. This is because, as the exhaust fan 162 operates, sidestream smoke generated during smoking may be smoothly exhausted.

Meanwhile, according to some embodiments of the present disclosure, the controller 18 may perform control of the vent 111 and the exhaust fan 162 on the basis of puff events of the user during smoking. However, a specific control method thereof may vary.

In some examples, the controller 18 may adjust a degree of opening/closing of the vent 111 on the basis of puff events. Specifically, the controller 18 may make the vent 111 more open when puffs are performed and make the vent 111 less open when puffs are not performed. In this case, outside air may more smoothly enter while puffs are performed, and thus combustion of the smoking article 30 may be further promoted. Also, a problem that unpurified sidestream smoke leaks through the vent 111 while puffs are not performed may be alleviated. For reference, while puffs are performed, since a lot of sidestream smoke is not generated and an air flow path through which gas enters is formed through the vent 111, leaking of sidestream smoke may not occur even when the vent 111 is opened.

In some other examples, the controller 18 may operate (rotate) the exhaust fan 162 in a reverse direction while puffs are performed and may operate (rotate) the exhaust fan 162 in a forward direction while puffs are not performed. Here, the forward direction may refer to a rotational direction that causes sidestream smoke to be suctioned toward the filter structure 161, and the reverse direction may refer to the opposite rotational direction. In this case, while puffs are performed, an air flow may be concentrated toward the upstream end of the smoking article 30 and combustion may be promoted, and while puffs are not performed, sidestream smoke may be suctioned toward the filter structure 161 and smoothly exhausted.

In still some other examples, the controller 18 may adjust the degree of opening/closing of the vent 111 and/or the rotational speed of the exhaust fan 162 on the basis of information on puff events (e.g., a puff intensity, a puff interval, a puff length, etc.). For example, in a case in which the puff intensity increases, the puff length increases, or the puff interval decreases, the controller 18 may make the vent 111 more open. In the opposite case, the controller 18 may make the vent 111 less open. This is because the puff intensity is likely to increase when combustion of the smoking article 30 is not smoothly performed. Alternatively, in the case in which the puff intensity increases, the puff length increases, or the puff interval decreases, the controller 18 may increase the rotational speed of the exhaust fan 162 while puffs are performed (that is, increase the rotational speed thereof in the reverse direction). In the opposite case, the controller 18 may decrease the rotational speed of the exhaust fan 162.

In yet some other examples, the controller 18 may perform control on the basis of combinations of the above-described examples.

In the previous embodiments, a method in which the controller 18 detects a puff may vary. For example, the controller 18 may detect a puff on the basis of a change in temperature measured by the temperature sensor 20. Specifically, when a degree of temperature change is a reference value or more (e.g., when combustion temperature of the smoking article 30 instantaneously increases), the controller 18 may recognize that a puff is generated. This may be understood as using a phenomenon in which combustion is accelerated at the upstream end of the smoking article 30 by puffs. Also, the controller 18 may determine a puff intensity on the basis of a degree of temperature change. For example, the controller 18 may determine the puff intensity to be high as the degree of temperature change is high and determine the puff intensity to be low as the degree of temperature change is low.

In step S30, the controller 18 may detect the end of smoking. In this step, the controller 18 may detect the end of smoking using various methods, and the method may vary according to the embodiment.

In some embodiments, the controller 18 may detect the end of smoking on the basis of a temperature measured by the temperature sensor 20. Here, for example, the temperature sensor 20 may be disposed near the downstream end of the smoking material portion of the smoking article 30. For example, when the temperature measured by the temperature sensor 20 is a reference value or more or the measured temperature increases and then decreases, the controller 18 may determine that smoking has ended.

In some other embodiments, the controller 18 may detect the end of smoking on the basis of puff events, the time elapsed after the start of smoking, and the like. For example, when a predetermined amount of time has elapsed after the start of smoking, a puff number is a reference value or more, or a puff has not been detected for a predetermined amount of time or more after a previous puff, the controller 18 may determine that smoking has ended.

In still some other embodiments, smoking termination conditions may be set. For example, smoking termination conditions may be set on the basis of a puff number, the time elapsed after the start of smoking, and the like. In this case, in response to predetermined smoking termination conditions being satisfied, the controller 18 may determine to end smoking.

In step S40, in response to detecting the end of smoking, the controller 18 may perform an automatic extinguishing function. In this step, a method in which the controller 18 performs the automatic extinguishing function may vary.

In some embodiments, the controller 18 may close the vent 111 and stop operation of the exhaust fan 162. In this case, since outside air stops entering due to closing of the vent 111, the smoking article 30 may be naturally extinguished due to lack of oxygen.

In some other embodiments, the controller 18 may close the vent 111 and operate the exhaust fan 162 for a predetermined amount of time and then stop the operation or continuously operate the exhaust fan 162. In this case, since outside air stops entering due to closing of the vent 111, and inside air is exhausted to the outside through the exhaust fan 162, the smoking article 30 may be naturally extinguished.

In still some other embodiments, the controller 18 may perform the automatic extinguishing function by operating the cutting portion 23.

In yet some other embodiments, the controller 18 may perform the automatic extinguishing function on the basis of combinations of the above-described embodiments. For example, the controller 18 may perform the automatic extinguishing function through a first extinguishing process of closing the vent 111 and stopping operation of the exhaust fan 162 and a second extinguishing process of cutting the inserted smoking article 30 through the cutting portion 23. Here, the first extinguishing process and the second extinguishing process may be performed in any order.

Meanwhile, according to some embodiments of the present disclosure, in response to detecting the end of smoking, the controller 18 may operate the exhaust fan 162 in the forward direction (that is, the suctioning direction) for a predetermined amount of time. In this case, since smoking by-products such as cigarette ash gather near the filter structure 161 due to the exhaust fan 162, the inside of the sidestream smoke removal device 1 may be cleaned more easily. In some examples, the controller 18 may also adjust the rotational speed of the exhaust fan 162 on the basis of the extent to which the smoking article 30 is burned. For example, when the smoking article 30 is completely burned, since the amount of by-products is large, the controller 18 may rotate the exhaust fan 162 at a higher speed. In the opposite case, the controller 18 may rotate the exhaust fan 162 at a lower speed. The extent to which the smoking article 30 is burned may be determined on the basis of a puff number, the time elapsed after the start of smoking, the current smoking position (see FIG. 9), and the like.

The control method according to some embodiments of the present disclosure has been described above with reference to FIG. 7. According to the above-described method, since the vent 111 and the exhaust fan 162 may be appropriately controlled according to smoking progress, a user's satisfaction with the device may be improved. Also, since the automatic extinguishing function is performed upon the end of smoking, the risk of fire and burns due to the user's carelessness may be minimized.

Hereinafter, a control method according to some other embodiments of the present disclosure will be described with reference to FIG. 8. However, for clarity of the present disclosure, description of contents overlapping with those related to the control method illustrated in FIG. 7 will be omitted.

Figure 8:
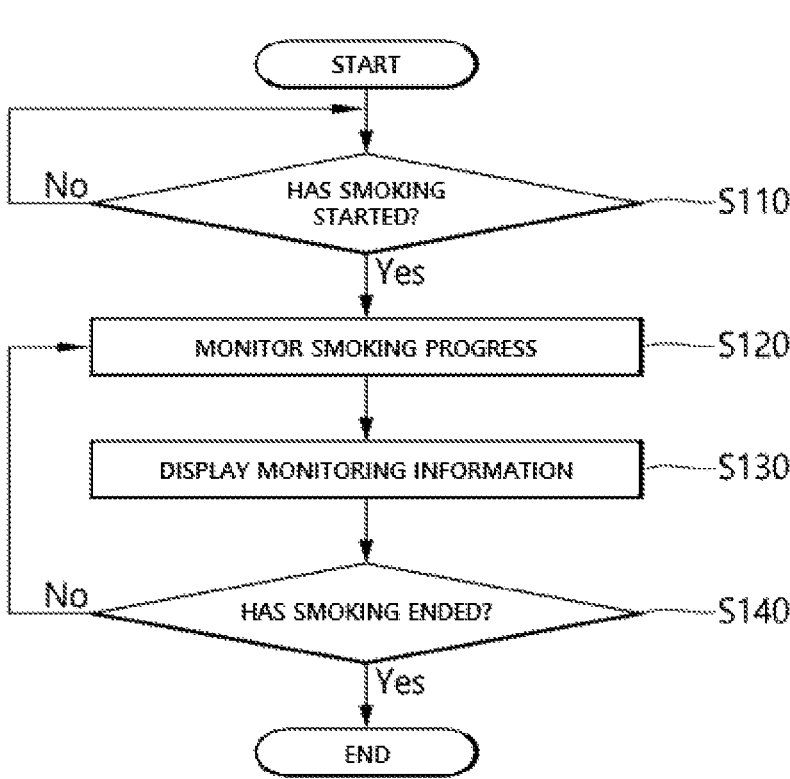
FIG. 8 is an exemplary flowchart showing a control method of a sidestream smoke removal device according to some other embodiments of the present disclosure.

FIG. 8 is an exemplary flowchart showing the control method according to some other embodiments of the present disclosure. However, this is only a preferred embodiment for achieving the objectives of the present disclosure, and, of course, some steps may be added or omitted as necessary.

As illustrated in FIG. 8, the control method may begin by detecting the start of smoking (S110). In this step, the controller 18 may display an indicator indicating the start of smoking on the display 19. For additional description of this step, refer to step S10 described above with reference to FIG. 7.

In step S120, the controller 18 may monitor smoking progress. Here, smoking progress may include any situation related to smoking such as the extent to which the smoking article 30 is smoked, puff events, and the like.

Figure 9:
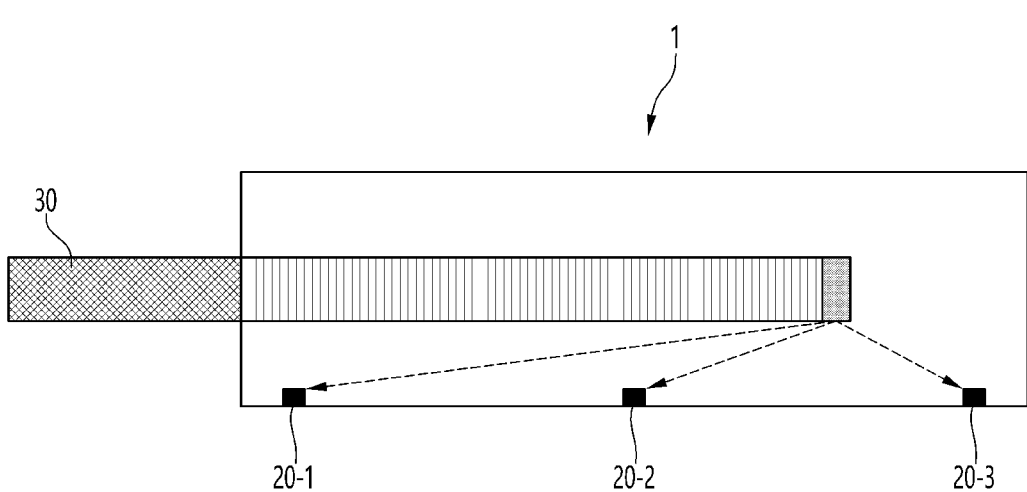
FIG. 9 is an exemplary view for describing a method of determining the current smoking position according to some embodiments of the present disclosure.

In some embodiments, the controller 18 may compare temperatures measured by a plurality of temperature sensors 20 disposed at different positions to accurately determine the extent to which the smoking article 30 is smoked (or the current smoking (combustion) position thereof). Specifically, let's assume that, as illustrated in FIG. 9, a plurality of temperature sensors 20-1, 20-2, and 20-3 are disposed in the longitudinal direction in the smoking space inside the sidestream smoke removal device 1. Then, the controller 18 may compare temperatures measured by a first temperature sensor 20-1, a second temperature sensor 20-2, and a third temperature sensor 20-3 to determine the current smoking position of the smoking article 30 and the extent to which the smoking article 30 is smoked. For example, in a case in which the temperature measured by the first temperature sensor 20-1 is the lowest, the temperature measured by the second temperature sensor 20-2 is lower than the temperature measured by the third temperature sensor 20-3, and the temperature measured by the third temperature sensor 20-3 is the highest, the controller 18 may determine that the current smoking position of the smoking article 30 is between the second temperature sensor 20-2 and the third temperature sensor 20-3 and closer to the third temperature sensor 20-3. Here, the controller 18 may determine that the larger the temperature difference between the second temperature sensor 20-2 and the third temperature sensor 20-3, the closer the current smoking position of the smoking article 30 is to the third temperature sensor 20-3.

In step S130, the controller 18 may display monitoring information through the display 19. However, types of monitoring information and a specific display method therefor may vary.

Figure 10:
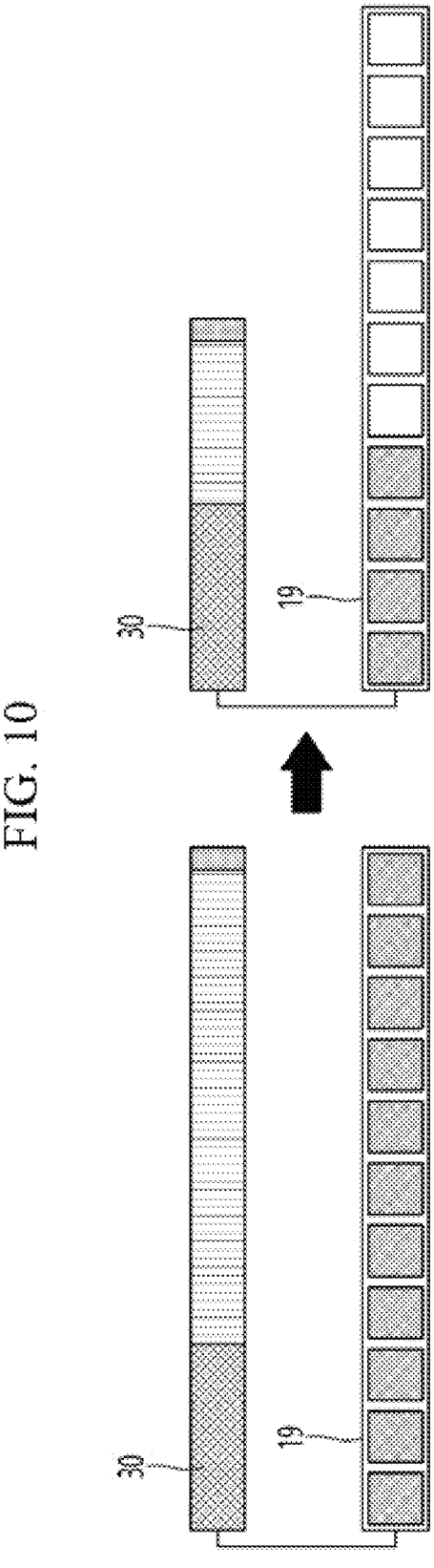
FIG. 10 is an exemplary view for describing a method of displaying the extent to which a smoking article is smoked according to some embodiments of the present disclosure.

In some embodiments, the controller 18 may, through the display 19, display information related to the extent to which the smoking article 30 is smoked. For example, the controller 18 may display an indicator (e.g., a cigarette-shaped object) indicating the smoking article 30 (or the extent to which the smoking article 30 is smoked) and may control the display 19 to reduce the length of the indicator as smoking is performed. As another example, as illustrated in FIG. 10, the controller 18 may display, through the display 19, a display area (e.g., LED lighting areas/sections) indicating the extent to which the smoking article 30 is smoked and may control the display 19 to change the size of the display area (e.g., the number of LED lighting areas/sections) as smoking is performed. Here, the size of the display area may increase or decrease as smoking is performed.

In some other embodiments, the controller 18 may display information related to puff events through the display 19. For example, the controller 18 may display a puff count. As another example, the controller 18 may, in response to detecting puffs, display an indicator indicating that puffs are being performed.

In step S140, the controller 18 may detect the end of smoking. In this step, the controller 18 may display an indicator indicating the end of smoking through the display 19. For additional description of this step, refer to step S40 described above with reference to FIG. 7.

Meanwhile, the controller 18 may perform the automatic extinguishing function upon detecting the end of smoking, may display an indicator indicating automatic extinguishing through the display 19, and may also display an indicator indicating completion of automatic extinguishing upon completion of automatic extinguishing.

The control method according to some other embodiments of the present disclosure has been described above with reference to FIGS. 8 to 10. According to the above-described method, smoking progress information may be displayed through the display 19. Accordingly, since the user may check smoking progress in real time through the display 19, ease of use and safety may be significantly improved.

The technical spirit of the present disclosure described above with reference to FIGS. 1 to 10 may at least partially be implemented with computer-readable code on computer-readable recording media. Examples of the computer-readable recording media may include removable recording media (a compact disc (CD), a digital versatile disc (DVD), a Blu-Ray disk, a universal serial bus (USB) storage device, a removable hard disk) or non-removable recording media (a read-only memory (ROM), a random access memory (RAM), a built-in hard disk). Computer programs recorded in the computer-readable recording media may be sent to other computing devices through a network, such as the Internet, and installed in the other computing devices so as to be used in the other computing devices.

All the components constituting the embodiments of the present disclosure have been described above as being combined into one body or being operated in combination, but the technical spirit of the present disclosure is not necessarily limited to the embodiments. That is, any one or more of the components may be selectively operated in combination within the intended scope of the present disclosure.

Operations are illustrated in a specific order in the drawings, but it should not be understood that the operations must be performed in a specific order or sequential order shown, or that all illustrated operations must be performed to obtain a desired result. In certain circumstances, multitasking and parallel processing may be advantageous. Moreover, the separation of various components in the embodiments described above should not be understood as necessarily requiring such separation, and it should be understood that the program components and systems described may generally be integrated together into a single software product or packaged into multiple software products.

The embodiments of the present disclosure have been described above with reference to the accompanying drawings, but those of ordinary skill in the art to which the present disclosure pertains should understand that the present disclosure may be embodied in other specific forms without changing the technical spirit or essential features thereof. Therefore, the embodiments described above should be understood as being illustrative, instead of limiting, in all aspects. The scope of the present disclosure should be interpreted by the claims below, and any technical spirit within the scope equivalent to the claims should be interpreted as falling within the scope of the technical spirit defined by the present disclosure.

What is claimed is:

1. A sidestream smoke removal device comprising:
a housing in which a smoking space is formed;
an article insertion portion disposed at one end of the housing and configured to form an opening for insertion of a smoking article into the smoking space;
an ignition portion configured to ignite the smoking article inserted into the smoking space;
a sidestream smoke processing portion configured to process sidestream smoke generated from the smoking article inserted into the smoking space;
a temperature sensor including a first temperature sensor and a second temperature sensor disposed at different positions inside the smoking space along a longitudinal direction of the smoking article, and being configured to measure a temperature of the smoking article inserted into the smoking space, the first temperature sensor being disposed to measure a temperature near a downstream end of a smoking material portion constituting the inserted smoking article, the second temperature sensor being disposed to measure a temperature near an upstream end of the smoking material portion opposite to the first temperature sensor;
a display disposed outside the housing;
a vent formed in the housing and through which outside air enters; and
a controller configured to:
detect a start of smoking of the smoking article based on a temperature measured by the second temperature sensor,
based on detecting the start of the smoking of the smoking article, open the vent,
in a state in which the vent is opened, control the vent such that a degree of opening of the vent during a puff while smoking is greater than the degree of opening of the vent during a non-puff while smoking,
in response to detecting an end of smoking, close the vent,
determine an intensity of a puff event based on a change in the measured temperature,
monitor smoking progress with respect to the smoking article by determining a position of an ignited portion of the smoking article between the first temperature sensor and the second temperature sensor based on a comparison between a temperature measured by the first temperature sensor and a temperature measured by the second temperature sensor, on the basis of the temperature measured by the first temperature sensor, determine whether smoking has ended, and display a monitoring result through the display, including information about the position of the ignited portion of the smoking article.

2. The sidestream smoke removal device of claim 1, wherein:

the temperature sensor has an elongated body and is disposed in the longitudinal direction of the inserted smoking article;

the temperature sensor is configured so that the first temperature sensor corresponding to a first portion of the elongated body measures a temperature of a first corresponding portion of the smoking material portion constituting the smoking article and the second temperature sensor corresponding to a second portion of the elongated body measures a temperature of a second corresponding portion of the smoking material portion; and the controller monitors the smoking progress on the basis of the temperatures measured by the first temperature sensor and the second temperature sensor.

3. The sidestream smoke removal device of claim 1, wherein the controller displays, through the display, information related to the position of the ignited portion indicating an extent to which the smoking article is smoked and controls the display so that a length of an indicator or a size of a display area, which indicates an extent to which the smoking article is smoked, changes as smoking is performed.

4. The sidestream smoke removal device of claim 1, wherein the controller monitors the puff event on the basis of the change in the measured temperature and displays information related to the puff event through the display.

5. The sidestream smoke removal device of claim 1, wherein:

the sidestream smoke processing portion includes an exhaust fan configured to exhaust the sidestream smoke; and the controller detects the end of smoking on the basis of the measured temperature and, in response to detecting the end of smoking, closes the vent and stops operation of the exhaust fan.

6. The sidestream smoke removal device of claim 1, wherein the sidestream smoke processing portion includes an exhaust fan configured to exhaust the sidestream smoke, and wherein the controller is further configured to control the degree of opening the vent and a rotational speed of the exhaust fan based on the intensity of the puff event.

7. The sidestream smoke removal device of claim 6, wherein the controller is further configured to:

in a state in which a puff event is not being performed, control the exhaust fan to operate in a first direction to generate an airflow toward an outside of the housing, and when a puff event is being performed, control the exhaust fan to operate in a reverse direction to generate an airflow toward an inside of the housing.

\* \* \* \* \*